Dec. 2, 1930. W. W. EDWARDS 1,783,330
SAW GUIDE
Filed Dec. 16, 1929
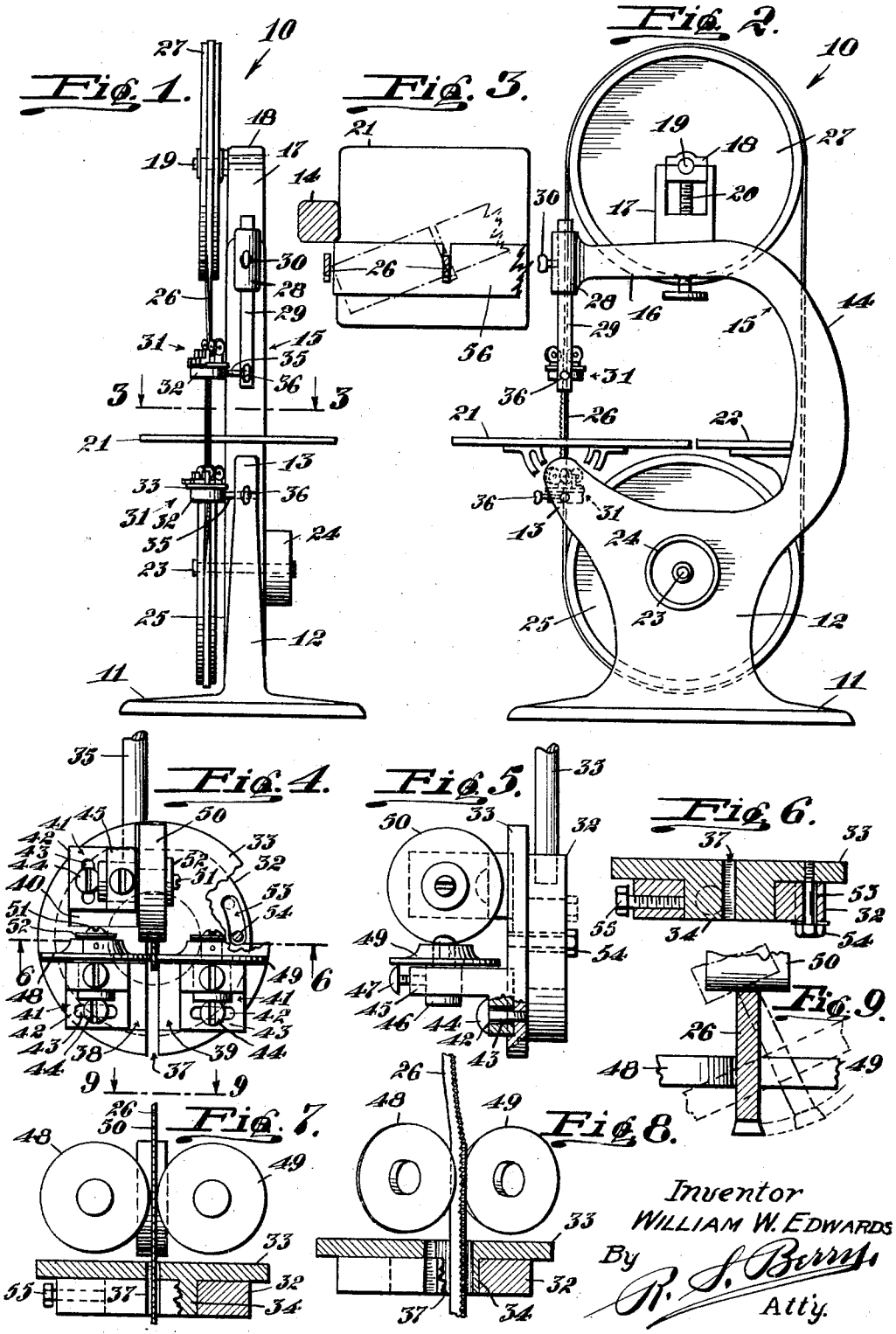
Inventor
WILLIAM W. EDWARDS
By R. S. Berry
Atty.

Patented Dec. 2, 1930

1,783,330

UNITED STATES PATENT OFFICE

WILLIAM W. EDWARDS, OF LOS ANGELES, CALIFORNIA

SAW GUIDE

Application filed December 16, 1929. Serial No. 414,422.

My invention relates to band-saw guides in band-saw machines, and it aims at providing a band-saw machine with a pair of guides which are adapted to be secured in aligned positions in the machine so as to allow the band saw to pass therethrough with clearance and to hold the portion of the band saw between the guides substantially in one plane.

Band-saw machines, as constructed at present, are adapted only for sawing off comparatively short pieces and are useless when the pieces that are to be cut off are comparatively long, since the distance from the downwardly travelling portion of the band saw to the upwardly travelling portion thereof or to the rising column of the saw-supporting frame is not sufficient for allowing long pieces to clear the column or the upwardly travelling portion of the band saw.

The main object of my invention is therefore to construct each band-saw guide of two members, mounted in rotatable relation to each other and provided with means for engaging the sides of the band saw in such a manner that the band saw may be twisted, so that, when the guides are properly set and positioned in the machine, the portion of the band saw between the guides will be in a plane at such an angle to the plane in which the downwardly and upwardly travelling portions of the band saw lie as to allow comparatively long and wide pieces to be sawed off without contacting the upwardly travelling portion of the band saw or without contacting the rising column of the saw-supporting frame.

Another object of the invention is to construct band-saw guides for band-saw machines so that the guides may be quickly and easily set and positioned in the machines, thereby also expediting the insertion of the band saws, which for various purposes differ greatly in width and thickness or otherwise and therefore must be frequently changed in order to meet different working requirements.

A further object of the invention is to construct band-saw guides so that they may be quickly and easily assembled or disassembled and that they can not easily get out of order, thereby also reducing the cost of manufacture of the guides.

With the above mentioned objects and with other objects in view, my invention consists in the novel construction and combination of parts hereinafter described, illustrated in the accompanying drawings, and set forth in the appended claims, it being understood that various changes in the form, proportion, size and minor details of construction within the scope of the claims may be made without departing from the spirit, or without sacrificing any of the advantages, of the invention.

In the drawings:

Fig. 1 is a side elevation of a band-saw machine equipped with a pair of band-saw guides of my invention;

Fig. 2 is a rear elevation of the machine shown in Fig. 1;

Fig. 3 is a view showing in full lines how a piece of work of a certain length on the work table of a band-saw machine, although clearing the upwardly travelling portion of the band saw, contacts the rising column before the piece is entirely cut through by the band saw, and showing in dot-and-dash lines how, by the twisting of the downwardly travelling portion of the band saw, a piece of work may be entirely cut off even before it comes in contact with the upwardly travelling portion of the band saw, the view being taken from the left in Fig. 1 and in a plane indicated by the line 3—3 in that figure;

Fig. 4 is a partly broken plan view of one of the band-saw guides;

Fig. 5 is a side elevation of the band-saw guide, as viewed from the right in Fig. 4;

Fig. 6 is a section of the two rotatably related members of the band-saw guide, the view being taken in a plane indicated by the line 6—6 in Fig. 4;

Fig. 7 is a diagrammatic and partly sectional front elevation of one of the band-saw guides, the view showing the guiding means as holding the portion of the band saw in the guide in untwisted relation to the other portion of the band saw;

Fig. 8 is a view similar to Fig. 7, but with the parts of the guide in such a position as to hold the portion of the band saw in the guide in twisted relation to the other portion of the band saw; and Fig. 9 is a fragmentary and diagrammatic view taken in a plane indicated by the line 9—9 in Fig. 7, the view showing in full lines a section of a band saw held by the anti-friction wheels in a normal or untwisted position, and showing in dotted lines the anti-friction wheels and the band saw as they appear when the band saw has been twisted to another position, the arc described by the teeth of the saw in the twisting movement of the saw also being indicated by dotted lines.

A band-saw machine, to which band-saw guides of my invention are applicable, is indicated in the drawings by the numeral 10. This machine may be of any approved type and is in Figs. 1 and 2 of the drawings shown as including a base 11. Integral with the base is a support 12, which at its upper forward portion terminates in an ear 13 and at its upper rearward portion terminates in a column 14 of an upwardly extending frame 15. The frame is at its upper portion formed with a substantially horizontal arm 16 adapted to carry thereon a bracket 17 in which is vertically slidable a bearing 18 for supporting therein transversely to the frame 15 a shaft 19, and the vertical adjustment of the bearing in the bracket is effected by a screw 20.

On the ear 13 is supported a work table 21, preferably so as to be adapted to be in a horizontal plane with another table 22, which is suitably supported on the column 14, or to be held in a tilted position.

A shaft 23, extending transversely of the support 12, is suitably journalled in the latter and has on its rearward portion secured a driving pulley 24 and on its forward portion a wheel 25, adapted to be peripherally in driving contact with a band saw 26. From the periphery of the wheel 25 the band saw passes to and over the periphery of an idler wheel 27, which is rotatably mounted on the forward portion of the shaft 19 so as to be in a plane with the wheel 25.

The arm 16 terminates in a sleeve 28, and a cross-sectionally rectangular bar 29 fits slidably in the sleeve and is secured in adjusted position therein by a thumbscrew 30, the sleeve being in substantially vertical alignment with the ear 13. Adapted to be arranged in vertical alignment with each other are two band-saw guides 31, each comprising a centrally bored cylindrical member 32 and a flanged member 33 adapted to be seated with its flange upon the member 32, the member 33 being centrally provided with a hub 34, which fits rotatably in the bore of the member 32, and the member 32 having secured therein a laterally extending shank 35, adapted to fit in each of parallel transverse openings in the bar 29 and the ear 13. By means of thumbscrews 36, adapted to be in locking engagement with the shanks in the bar and the ear, the guides 31 are respectively secured in their aligned positions in the band-saw machine 10.

In the members 32 and 33 are formed radial slots 37, which are adapted to register with each other and are of such a width as to allow the band saw 26 to pass with clearance through each guide 31. Guideways 38, 39 and 40 are formed in the top of the flanged member 33, the guideways 38 and 39 being transverse to the slot in the member and aligned with each other, and the guideway 40 being at one side of the slot and virtually parallel therewith. In each of the guideways is slidably fitted a bracket 41, the base portion 42 of which has therein an elongated opening 43 for clearing the stem of a screw 44 so that each bracket may be adjustably secured in its respective guideway to the flanged member 33 by the screw. The standard 45 of each bracket 41 has transversely therein a bore adapted to receive a shaft 46, and each shaft is secured in the respective bracket by a screw 47. Upon the shaft 46 in the bracket 41 mounted in the guideway 38 is rotatably mounted an anti-friction wheel 48, and a similar anti-friction wheel 49 is rotatably carried by the shaft in the bracket mounted in the guideway 39, while the shaft 46 in the bracket 41 mounted in the guideway 40 carries rotatably thereon an anti-friction wheel 50, the wheels 48 and 49 being comparatively thin at their peripheral portions and adapted to guidably engage the sides of the band saw 26, and the wheel 50 being thicker at its periphery than the wheels 48 and 49 and adapted to peripherally and guidably engage the back of the band saw. In order to retain each wheel on its respective shaft, a screw 51 is screwed into the end thereof, a washer 52 preferably being interposed between the wheel and the head of the screw.

Adjacent to its periphery the member 32 has formed therein an arcuate slot 53, and the member 33 has in its flange a threaded opening adapted to register with the slot 53 and to receive therein the threaded end of a bolt 54 which extends with clearance through the slot so that the flanged member may be restricted in its rotative movement upon the member 32 by the engagement of the bolt stem with the end portions of the slot. Another bolt 55 has its stem threaded through the body of the member 32 so as to be adapted to engage the hub 34 of the flanged member. The bolts 54 and 55 thus cooperate in securing the members 32 and 33 to each other.

In operating, when it is desired to saw off only a short piece of work, the band-saw guides 31 are merely placed in alignment in the machine 10, as before described, so that the portion of the band saw between the anti-friction rollers in one guide 31 and the anti-friction rollers in the other guide is in an untwisted relation to the portions above and below the guides, as illustrated in Figs. 4, 7 and 9. If, however, it is required to saw off a piece of work, such as a board 56, which is longer than the distance from the downwardly travelling portion of the band saw to the upwardly travelling portion thereof or to the column 14 of the frame 15, as illustrated in Fig. 3, the flanged members 33 are rotated upon the respective members 32 of the guides so that the saw-guiding anti-friction rollers will hold the portion of the band saw between the guides twisted as illustrated in Fig. 8 and indicated in dotted lines in Fig. 9, to such an angle as to allow the cutting off of the board 56 without causing the board to contact the column 14 or the upwardly travelling portion of the band saw, as indicated by dot-and-dash lines in Fig. 3.

It is clear from the foregoing that the brackets 41 can be quickly adjusted to, and secured in, different positions in the respective guideways, and that therefore the guides 10 can be quickly adjusted for band saws of different width and thickness. It is also clear that the flanged members 33 can be quickly rotated to the required positions relative to the members 32 so as to hold the downwardly travelling portion of the band saw in a plane at any required angle, as defined by the slot 53, in order to effect the proper cutting off of a piece of work.

I claim:

1. A band-saw guide comprising two members mounted in rotatable relation to each other and allowing the band saw to pass therethrough with clearance; means for securing the members to each other in any of selected rotative positions; means adjustably mounted upon one of the members so as to guidably engage the sides of the band saw, the saw-engaging means being adapted to twist the band saw in certain selected positions of the members; and means for securing the saw-engaging means, in any of the adjusted positions to the respective member.

2. A band-saw guide comprising two members mounted in rotatable relation to each other and allowing the band saw to pass therethrough with clearance; means for securing the members to each other in any of selected rotative positions; anti-friction wheels adjustably and rotatably mounted upon one of the members so as to guidably engage the sides of the band saw, the anti-friction wheels being adapted to twist the band saw in certain selected positions of the members; and means for securing the anti-friction wheels in any of the adjusted positions to the respective member.

3. A band-saw guide comprising two members mounted in rotatable relation to each other and allowing the band saw to pass therethrough with clearance; means for securing the members to each other in any of selected rotative positions; means adjustably mounted upon one of the members so as to guidably engage the sides of the band saw, the saw-engaging means being adapted to twist the band saw in certain selected positions of the members; means for securing the saw-engaging means in any of the adjusted positions to the respective member; means adjustably mounted upon the member carrying said saw-engaging means for guidably engaging the back of the saw blade; and means for securing the last-mentioned guiding means in any of the adjusted positions to the respective member.

4. A band-saw guide comprising two members mounted in rotative relation to each other and allowing the band saw to pass therethrough with clearance; means for securing the members to each other in any of selected rotative positions; anti-friction wheels adjustably and rotatably mounted upon one of the members so as to guidably engage the sides of the band saw, the anti-friction wheels being adapted to twist the band saw in certain selected positions of the members; means for securing the anti-friction wheels in any of the adjusted positions to the respective member; an anti-friction wheel adjustably mounted upon the member carrying the first named anti-friction wheels and arranged to peripherally and guidably engage the back of the band saw; and means for securing the last-mentioned anti-friction wheel in any of the adjusted positions to the respective member.

5. A band-saw guide comprising a member provided with an opening therein and adapted to be secured in a band-saw machine; a flanged member adapted to be seated with the flange upon the first member and provided with a hub portion rotatably fitting the opening in the first member, both of the members being slotted so as to allow the band saw to pass with clearance through the slots and through the hub portion of the flanged member, and the flanged member having therein two guideways extending transversely to the slot; a bracket slidably fitting in each guideway; a shaft secured in each bracket so as to be transverse to the respective guideway; a wheel rotatably mounted on each shaft so that the wheels are adapted to guidably engage the sides of the band saw and in certain selected rotative positions of the flanged member upon the first member to twist the band saw; means for securing the flanged member in any of its rotative positions to the first member; and means for securing the respective brackets in adjusted positions to the flanged member.

6. A band-saw guide comprising a member provided with an opening therein and adapted to be secured in a band-saw machine; a flanged member adapted to be seated with the flange upon the first member and provided with a hub portion rotatably fitting the opening in the first member, both of the members being slotted so as to allow the band saw to pass with clearance through the slots and through the hub portion of the flanged member, and the flanged member having therein two guideways extending transversely to the slot, and a third guideway extending substantially in parallelism with, and at one side of, the slot; a bracket slidably fitting in each guideway; a shaft secured in each bracket so as to be transverse to the respective guideway; a wheel rotatably mounted on each shaft so that the wheels on the brackets in the transverse guideways are adapted to guidably engage the sides of the band saw and in certain selected rotative positions of the flanged member upon the first member to twist the band saw, and so that the wheel on the bracket in the third guideway is adapted to peripherally and guidably engage the back of the band saw; means for securing the flanged member in any of its rotative positions to the first member; and means for securing the respective brackets in adjusted positions to the flanged member.

7. A band-saw guide comprising a member provided with an opening therein and adapted to be secured in a band-saw machine; a flanged member adapted to be seated with the flange upon the first member and provided with a hub portion rotatably fitting the opening in the first member, both of the members being slotted so as to allow the band saw to pass with clearance through the slots and through the hub portion of the flanged member, and the flanged member having therein two guideways extending transversely to the slot, and a third guideway extending substantially in parallelism with, and at one side of, the slot; a bracket slidably fitting in each guideway; a shaft secured in each bracket so as to be transverse to the respective guideway; a wheel rotatably mounted on each shaft so that the wheels on the brackets in the transverse guideways are adapted to guidably engage the sides of the band saw and in certain selected rotative positions of the flanged member upon the first member to twist the band saw, and so that the wheel on the bracket in the third guideway is adapted to peripherally and guidably engage the back of the band saw; means for securing the flanged member in any of its rotative positions to the first member; means for restricting the rotative movement of the flanged member upon the first member; and means for securing the respective brackets in adjusted positions to the flanged member.

WILLIAM W. EDWARDS.